United States Patent Office 3,533,237
Patented Oct. 13, 1970

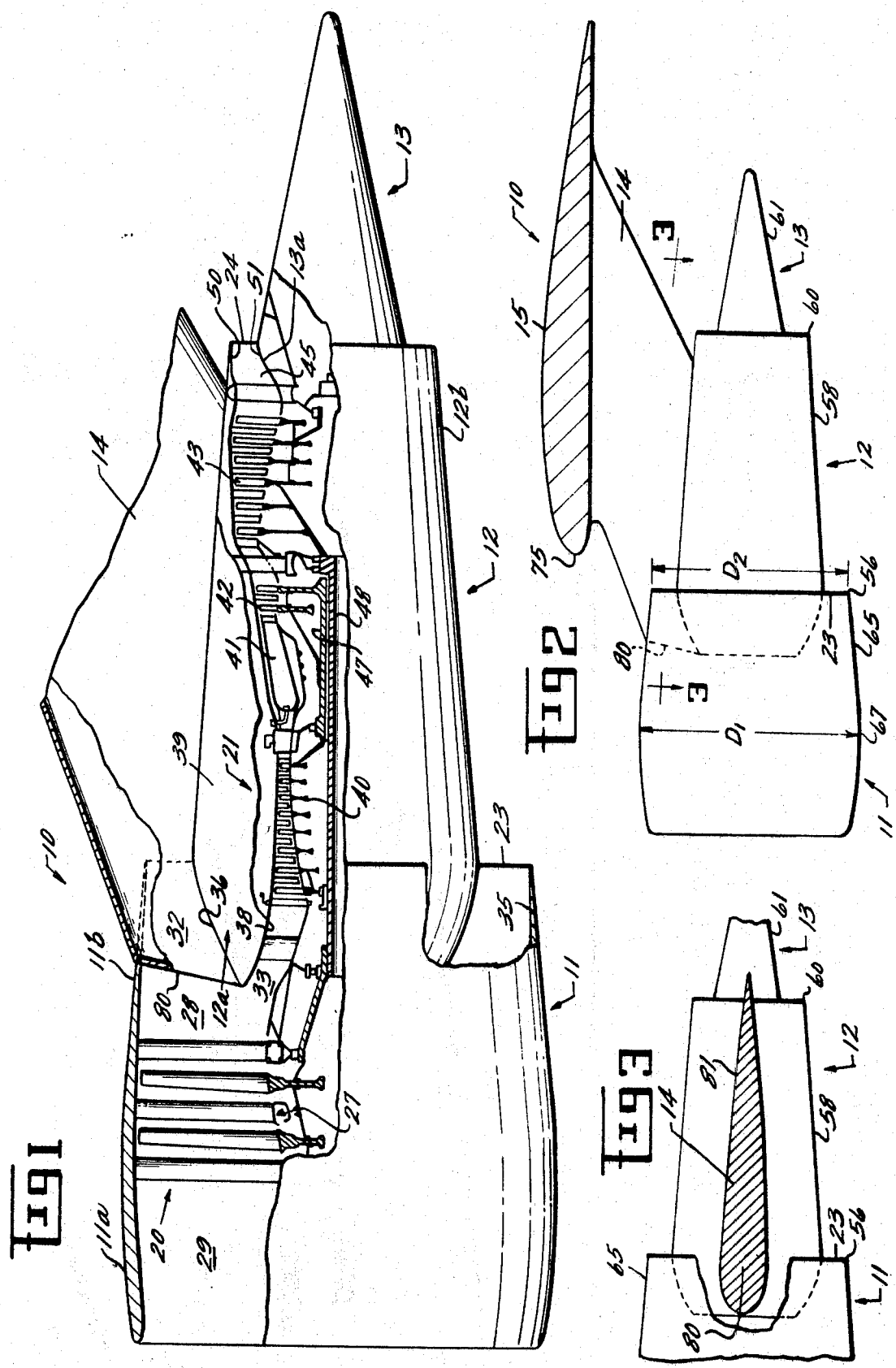

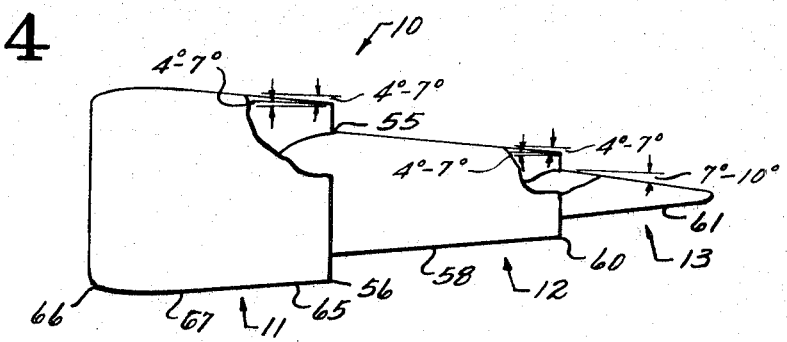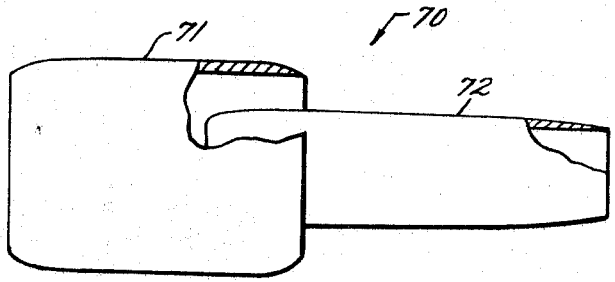

3,533,237
LOW DRAG NACELLE ARRANGEMENT FOR JET PROPULSION POWER PLANTS
George R. Rabone, Cincinnati, Ohio, and Charles G. Dibble, Redlands, Calif., assignors to General Electric Company, a corporation of New York
Continuation of application Ser. No. 379,669, July 1, 1964. This application Aug. 31, 1967, Ser. No. 666,546
Int. Cl. F02k 3/04
U.S. Cl. 60—226                                 5 Claims

ABSTRACT OF THE DISCLOSURE

A low drag nacelle structure for a turbofan engine having first, second and third wall members and wherein the first and second wall members, respectively, concentrically surround the fan and core engine; each wall member is formed with an upstream portion, a downstream portion, and a maximum diameter portion or plane of maximum diametral cross-section therebetween. The upstream portions of the second and third wall members are, respectively, concentrically disposed within and in spaced relation to the downstream portion of the first wall member and the downstream portion of the second wall member, to form, respectively, an annular bypass passage for discharging fan compressed air to the atmosphere and an annular passage for discharging hot gasses generated by the core engine to the atmosphere. The outer surfaces of the downstream portion of the second and third wall members are continuously convergent at a small angle in the downstream direction from at least the downstream end of the first and second wall members respectively. The downstream portion of the first wall member is also convergent at a small angle in the downstream direction while the inner surfaces of the downstream portions of the first wall member and the second wall member are convergent at a small angle in the downstream direction to direct the bypass fan air and the hot gasses, respectively, toward the convergent outer surface of the second and third wall members.

---

This application is a continuation of a copending application entitled "Improved Low Drag Exhaust Nozzle and Nacelle Arrangement for Turbofan Engines," filed on July 1, 1964 in the names of George R. Rabone and Charles G. Dibble, Ser. No. 379,669, now abandoned and assigned to the assignee of this application.

This invention relates to means for maintaining low drag losses in a jet propulsion power plant installation and, more particularly, to an aerodynamic nacelle configuration characterized by external wall surfaces which converge in the downstream direction at small angles.

In the design of modern jet propulsion power plants for aircraft propulsion, a primary objective is to attain the desired power output with minimum fuel consumption. Stated differently, it is desirable that the specific fuel consumption be as low as possible, "specific fuel consumption" being the pounds of fuel per hour required to produce a pound of thrust. In a "turbofan" engine, which is essentially a "turbojet" engine to which a fan or low pressure bypass compressor has been added, the specific fuel consumption is related to the bypass ratio, the "bypass ratio" being the mass ratio of pounds of bypass air discharged directly to atmosphere from the fan to pounds of exhaust products flowing through the turbojet nozzle. In theory, specific fuel consumption should be improved by increasing the bypass ratio of a turbofan engine. This does not always occur in practice, however, since the bypass ratio is but one of many engine parameters having a significant effect on specific and total fuel consumption.

For a variety of aerodynamic and mechanical reasons, it is not an easy matter in practice to provide turbofan engines capable of operating economically and effectively at high bypass ratios, such as 5.0 to 1 or more as compared to more conventional bypass ratios of 2.0 to 1 or less. In this respect, it will be appreciated that there is a direct correlation between bypass ratio and the required flow area within the fan. As a result, high bypass ratio turbofan engines normally have correspondingly large fan diameters and, consequently, frontal areas. Since the aerodynamic drag of an engine installed in an aircraft is a function of frontal area, it will be appreciated that increases in bypass ratio are normally accompanied by increases in aerodynamic drag, which acts against gross engine thrust to effectively reduce specific fuel consumption. Furthermore, increases in engine size are normally accompanied by correspondingly rapid changes in weight and external surface area, the frictional drag of the installed engine being a function of the external surface area of the engine nacelle. Increased weight and frictional drag require, in turn, greater thrust and possibly more total fuel than would be required by lighter weight and smaller engines having more modest bypass ratios. In other words, aerodynamic drag, frictional drag, and engine weight are significant engine parameters which commonly change along with bypass ratio and tend to counteract the theoretical fuel economy advantages of high bypass engines.

It is therefore an object of this invention to provide for jet propulsion power plants an aerodynamic arrangement for permitting the attainment of low specific fuel consumption.

Another object of this invention is to provide for jet propulsion power plants an aerodynamic nacelle arrangement capable of maintaining low drag losses during aircraft operation.

A further object is to provide for high bypass ratio turbofan engines an improved, lightweight nacelle arrangement capable of maintaining low drag losses during aircraft operation, thereby permitting the attainment of the theoretical fuel economy advantages of high bypass engines.

Briefly stated, in carrying out the invention in one form, a jet propulsion power plant installed in an aircraft includes an aerodynamic nacelle arrangement by which aerodynamic drag is maintained at low levels during aircraft operation. More particularly, the nacelle arrangement includes at least two coaxially mounted annular wall members. A first one of the wall members surrounds the means for producing the propusive gas stream, and the second one of the wall members is disposed with its upstream portion within the downstream portion of the first wall member and its downstream portion extending downstream of the first wall member. The overlapping portions of the wall members cooperate to form therbetween an annular passage for the discharge of the proposive gas stream. To maintain low aerodynamic drag, the exposed surfaces of the nacelle, including the first wall member and the downstream portion of the second wall member, converge at small angles in the downstream direction. The convergence of these outer surfaces provides projected areas upon which ambient air flowing around the power plant can exert forwardly directed thrust forces. These angles of convergence are preferably within the range of 4°–10°. By a further aspect of the invention, the inner surface of the downstream portion of the first wall member also converges in the downstream direction such that the propulsive gas is also directed along the exposed outer surface of the second wall member.

In a preferred form of the invention, a turbofan engine includes a first wall member surrounding a low pressure compressor, a second wall member surrounding a core engine, and a third wall member extending downstream of the second wall member, the first and second wall members cooperating to form a bypass passage for discharging a portion of the air compressed by the low pressure compressor and the second and third wall members cooperating to form a passage for the discharge of high energy gases produced by the core engine. To maintain low aerodynamic drag, the wall members converge as described above. In addition, in order to conserve weight and frictional drag, particularly in a high bypass ratio turbofan engine, the first wall member has an axial length that is less than one-half of the axial length of the engine, the ratio of the diameter of the downstream end of the first wall member to its maximum diameter being within the range of 0.92 to 0.97. By a further aspect of the invention, the engine includes an aerodynamic plyon for mounting the engine on an airframe, the pylon having a thickened upstream portion and a converging downstream portion. The pylon intersects the first wall member and is secured to the second wall member with its thickened portion located upstream of the exhaust opening of the bypass passage so as to minimize flow disturbance along the outer surface of the second wall member.

While the novel features of this invention are set forth with particularity in the appended claims, the invention, both as to organization and content, will be better understood and appreciated, along with other objects and features thereof, from the following detailed description when taken in conjunction with the drawings, in which:

FIG. 1 is a view partially in cross-section of a turbofan engine having a high bypass ratio fan incorporating the present invention;

FIG. 2 is a view of the engine mounted by means of an aerodynamic pylon to the wing of an aircraft;

FIG. 3 is a view taken along viewing line 3—3 of FIG. 2;

FIG. 4 is a schematic view of the engine of FIG. 1 illustrating various dimensions and angles pertinent to the present invention;

FIG. 5 is a graph illustrating, with respect to FIG. 4, the pressure distribution along the exterior surfaces of the engine; and FIGS. 6 and 7 are views similar to FIGS. 4 and 5 illustrating for comparison purposes an engine, and its pressure distribution, not having the exterior configuration taught by the present invention.

Referring now to the drawings, and particularly to FIGS. 1 and 2, a high bypass ratio turbofan engine constructed in accordance with the present invention is indicated generally by the numeral 10. The engine 10 includes an aerodynamic nacelle arrangement comprised of overlapping wall members 11, 12, and 13 and a pylon 14 for securing the engine 10 to airframe structure such as a wing 15.

Turning now to FIG. 1 for a more detailed description, the engine 10 includes a low pressure axial flow compressor or fan 20, a core engine 21, and an exhaust plug formed by the third wall member 13. Briefly stated, the entire supply of air to the engine flows through the fan 20 and is then divided into two portions, a bypass portion which is discharged through an exhaust opening 23 and a combustion supporting portion which flows through the core engine 21 before being discharged through an exhaust opening 24. Since the engine 10 is a high bypass ratio machine, it will be appreciated that the mass of air discharged through the exhaust opening 23 is substantially greater than that passing through the core engine 21 and the exhaust nozzle 24, preferably 5 to 10 times as great.

The first wall member 11 is an annular member coaxially surrounding the low pressure compressor or fan 20 and a composite rotor hub 27 to form with the hub 27 a main annular passage 28 communicating with an inlet plenum 29 formed within the upstream portion 11a of the first wall member 11. The annular passage 28 also communicates at its downstream end with an annular bypass passage 32 terminating in the exhaust opening 23 and an inlet passage 33 leading to the core engine 21. More particularly, the bypass passage 32 is formed between the inner surface 35 of the downstream portion 11b of the first wall member 11 and the outer surface 36 of the upstream portion 12a of the second wall member 12. the inner surface 35 converging in the downstream direction and the outer surface 36 diverging in the downstream direction such that the bypass passage 32 and the exhaust opening 23 comprise a converging nozzle for discharging compressed air to atmosphere. The inner surface 38 of the upstream portion 12a converges in the downstream direction to define the outer boundary of the inlet passage 33 to the core engine 21. In addition to providing proper wall surfaces for the bypass passage 32 and the inlet passage 33, the second wall member 12 has formed therein between the bypass and inlet passages an annular chamber 39 in which various controls and accessories may be conveniently mounted.

The core engine 21 includes a high pressure axial flow compressor 40, an annular combustor 41, a high pressure turbine 42, and a low pressure turbine 43 disposed in serial flow relationship between the inlet passage 33 and an exhaust passage 45 terminating in the exhaust opening 24. A hollow shaft 47 axially interconnects the high pressure turbine 42 and the high pressure compressor 40 for transmitting power therebetween, and an inner shaft 48 axially interconnects the low pressure turbine 43 and the rotor hub 27 for transmitting power therebetween. The inner shaft 48 is coaxially disposed within the shaft 47. In operation, air is compressed in the high pressure compressor 40 and is then supplied to the combustor 41 where fuel is burned to provide high energy combustion gases for driving the turbines 42 and 43 and, consequently, the high pressure compressor 40 and the fan 20. After driving the turbines, the hot exhaust products are discharged through the annular, converging exhaust passage 45 and the exhaust opening 24. More particularly, the exhaust passage 45 is formed between the inner surface 50 of the downstream portion 12b of the second wall member 12 and the outer surface 51 of the upstream portion 13a of the third wall member, or plug, 13, the inner surface 50 converging in the downstream direction and the outer surface 51 diverging in the downstream direction such that the exhaust passage 45 and the exhaust opening 24 comprise a converging nozzle for discharging combustion products to atmosphere.

Referring now to FIGS. 1 and 4, the external nacelle configuration of this invention will be described in detail, particularly with respect to the specific aerodynamic arrangement which makes possible low drag losses and concomitant fuel economy. As illustrated, the maximum diameter portion or plane of maximum diametral cross-section 55 of the second wall member 12 is axially aligned with the downstream end 56 of the first wall member 11 to form the bypass exhaust opening 23, and the outer surface 58 of the downstream portion 12b of the second wall member 12 converges in the downstream direction at a small angle, preferably within the range of 4°–7° measured in the manner indicated by FIG. 4. Similarly, the maximum diameter portion or plane of maximum diametral cross-section 13c of the third wall member 13 is axially aligned with the downstream end 60 of the second wall member 12 to form the hot gas exhaust opening 24, and the outer surface 61 of the downstream portion 13b of the third wall member converges in the downstream direction at a small angle, preferably within the range of 7°–10° measured in the manner indicated by FIG. 4. In the same general manner, the first wall member 11 has an outer surface 65 which diverges in the downstream direction between its upstream end 66 and a maximum diameter portion 67 and then converges at a small angle to its downstream end 56. Similarly to the second wall member, the outer surface 65 in the downstream portion 11b of the first wall member 11 converges at a small angle, preferably within the range of 4°–7°. In addition, as indicated above, the inner surface 35 of the downstream portion 11b of the first wall member 11 and the inner surface 50 of the downstream portion 12b of the second wall member 12 also converge at small angles in the downstream direction, preferably within the range of 4°–7° this convergence assures that the streams of bypass air and exhaust products will flow substantially along the exterior nacelle surfaces 58 and 61 of the downstream wall members.

During flight of an aircraft powered by the engine 10, ambient atmospheric air flows around the exterior of the nacelle. Because of the streamlined or aerodynamic configuration of the wall members 11, 12, and 13, much of the initial pressure loss in the ambient air is recovered along the converging surfaces 65, 58, and 61. As a result, it is convenient in practice to refer to these surfaces as "recompression surfaces." The pressure recovery which exists during flight along these surfaces is illustrated graphically by FIG. 5, whereas FIG. 7 illustrates the pressure distribution to be expected along the surfaces of the engine of FIG. 6, which does not have the converging exterior surfaces of the present invention. More particularly, because of the positive static pressures existing over much of the surfaces 58 and 61 and the convergence of the surfaces, the ambient air exerts pressure forces on the nacelle which include forwardly directed components. Stated differently, the convergence of the surfaces 65, 58 and 61 provides projected areas upon which the ambient air flowing around the nacelle can exert forwardly directed thrust forces. This recovered thrust thus reduces the overall aerodynamic drag produced by the engine and its nacelle. Actually, the bypass stream discharged through the exhaust opening 23 and the hot gas stream discharged through the exhaust opening 24 expand downstream of the openings and also exert pressure forces on the surfaces 58 and 61 to aid in reducing the overall aerodynamic drag.

An engine not having the aerodynamic arrangement of this invention, such as the engine 70 of FIG. 6, is unable to achieve the low aerodynamic drag made possible by the invention since the non-converging wall surfaces 71 and 72 do not provide similar pressure recovery as illustrated by FIG. 7 and, even if they were, do not provide a projected area upon which the pressure can act to produce forwardly directed thrust. Furthermore, it has been found that the convergence of the walls 65, 58 and 61 should be maintained within the ranges indicated previously in order to provide maximum pressure recovery and aerodynamic drag reduction. This means that the wall members 11, 12, and 13 and, consequently, the nacelle arrangement as a whole should generally have the geometric configuration of a surface of revolution of high fineness ratio.

However, it is not sufficient to the complete practice of the present invention to provide a nacelle arrangement having the general configuration of a surface of revolution of high fineness ratio. Such an arrangement could be provided by extending the first wall member 11, or fan cowl, aft to surround the entire engine. Such an arrangement would, however, substantially increase the overall weight of the engine, and thereby offset a substantial portion, if not all, of the performance gain resulting from nacelle streamlining. In addition, this approach would also increase substantially the overall surface area of the nacelle, thus increasing the frictional drag during aircraft operation. To the complete practice of the present invention, it is therefore essential that the first wall member 11 be relatively short, preferably less than one-half of the overall axial length of the engine, and that the second and third wall members 12 and 13, respectively, form a portion of the nacelle exterior surface area. Furthermore, it is desirable that the ratio of the diameter $D_2$ of the downstream end 56 of the first wall member to the diameter $D_1$ of its maximum diameter portion 67 be at least greater than 0.85 and preferably within the range of 0.92 to 0.97.

The aerodynamic configuration of the nacelle is not the only factor contributing to aerodynamic drag, the configuration of the pylon 14 and the airframe structure and the interactions between these elements and the nacelle also contributing to the overall aerodynamic drag. By the present invention, aerodynamic interference between the nacelle and the wing 15 is minimized since the short wall member 11 terminates with its downstream end 56 substantially upstream of the leading edge 75 of the wing 15. To further enhance aerodynamic performance, the pylon 14 has, as best shown by FIG. 3, a streamlined configuration including a thickened upstream portion 80 and a tapered downstream portion 81, the pylon 14 being secured to the second wall member 12 along most of its axial length. As illustrated by FIG. 2, the upstream thickened portion 80 of the pylon 14 intersects the downstream portion 11b of the first wall member 11 and is secured to the upstream portion 12a of the second wall member 12. In the practice of the present invention, it is desirable that the thickened portion 80 be located upstream of the bypass opening 23 so that flow disturbance is minimized along the converging outer surface 58 of the second wall member 12.

While the external wall surfaces 65, 58 and 61 in the preferred embodiment of the invention are straight-sided conical surfaces converging in the downstream direction, it will occur to those skilled in the art that the surfaces could be curved in the axial direction as well as in the circumferential direction, provided of course that the local angles of convergence remain with a desired range such as 4°–10°. Also, it will occur to those skilled in the art that the general concept of the present invention could be applied to a pure turbojet engine having a converging engine casing and a converging exhaust plug.

From the foregoing, it will be appreciated that the present invention provides for jet propulsion engines an aerodynamic nacelle arrangement capable of maintaining low drag losses during aircraft operation without increasing weight and frictional drag. As a result, the invention makes possible the attainment of good fuel economy.

It will be understood that the invention is not limited to the specific details of construction and arrangement of the embodiment illustrated and described herein since changes and modifications such as those discussed above will be obvious to those skilled in the art. It is therefore intended to cover in the appended claims all such changes and modifications which may occur to those skilled in the art without departing from the true spirit and scope of the invention.

What is claimed as new and is desired to secure by Letters Patent of the United States is:

1. A turbofan engine comprising:
   a low pressure compressor;
   a core engine coaxially mounted with respect to and downstream of said low pressure compressor for driving said low pressure compressor; and
   a low drag aerodynamic nacelle comprising:
   a first annular wall member coaxially surrounding said low pressure compressor and having an upstream portion terminating in an upstream end and a downstream portion terminating in a downstream end,
   a second annular wall member coaxially surrounding said core engine and having an upstream portion terminating in an upstream end and a downstream portion terminating in a downstream end,
   said upstream portion of said second wall member disposed substantially concentrically within and in spaced relation to the downstream portion of said first wall member to thereby form a first annular nozzle therebetween for discharging directly to the atmosphere a portion of the air compressed by said low pressure compressor, with said downstream portion of said second wall member extending downstream of said downstream end of said first wall member, a third wall member having an upstream portion and a downstream portion, said upstream portion of said third wall member disposed substantially concentrically within and in spaced relation to the downstream portion of said second wall member to thereby form a second annular nozzle therebetween for discharging directly to the atmosphere hot gases generated by said core engine, with said downstream portion of said third wall member extending downstream of said downstream end of said second wall member, said downstream portion of said first wall member having an outer surface convergent at a first small angle in the downstream direction said downstream portion of said second wall member having an outer surface which is continuously convergent at a second small angle in the downstream direction from at least the downstream end of said first wall member, and said downstream portion of said third wall member having an outer surface which is continuously convergent at a third small angle in a downstream direction from at least the downstream end of said second wall member, with said upstream portion of said second wall member formed with an outer surface convergent in the upstream direction and defining in cooperation with said convergent outer surface of said downstream portion of said second wall member a maximum diameter portion therebetween, said upstream portion of said third wall member having an outer surface convergent in the upstream direction and defining in cooperation with said convergent outer surface of said downstream portion of said third wall member a maximum diameter portion therebetween, with said maximum diameter portion of said second and said third wall members substantially aligned, respectively, with the downstream end of said first and said second wall members.

2. A turbofan engine as described by claim 1 further characterized in that said first and second small angles are within the range of 4°–7° and said third small angle is within the range of 7°–10°.

3. A turbofan engine as defined by claim 1 further characterized in that said downstream portions of said first and second wall members are formed with inner surfaces which converge in a downstream direction at selected angles within the range of 4°–7° to thereby, respectively, direct the air discharged by said first nozzle and the hot gases discharged by said second nozzle toward, respectively, said second wall member downstream portion and said third wall member downstream portion.

4. A turbofan engine comprising:
a low pressure compressor;
a core engine coaxially mounted with respect to and downstream of said low pressure compresor for driving said low pressure compressor; and
an aerodynamic nacelle comprising:
a first wall member coaxially surrounding said low pressure compressor and having an upstream portion terminating in a first end which forms an inlet for said low pressure compressor, a downstream portion terminating in a second end, and a plane of maximum diametral cross-section therebetween, said downstream portion having an outer surface convergent from said plane of maximum diametral cross-section to said second end at a first small angle, a second wall member coaxially surrounding said core engine, said second wall member including an upstream portion terminating in a first end, a downstream portion terminating in a second end, and a plane of maximum diametral cross-section therebetween, said downstream portion of said second wall member having an outer surface convergent from said plane of maximum diametral cross-section to said second end at a second small angle, said upstream portion of said second wall member being substantially concentrically disposed within and in spaced reltaion to said downstream portion of said first wall member to thereby form an anular bypass passage therebetween for discharging directly to the atmosphere a portion of the air compressed by said low pressure compressor, with said plane of maximum diametral cross-section of said second wall member being substantially aligned with said second end of said first wall member, a third wall member including an upstream portion, a downstream portion and a plane of maximum diametral cross-section therebetween, said downstream portion of said third wall member having an outer surface convergent in a downsteram direction from said plane of maximum diametral cross-section at a third small angle, said upstream portion of said third wall member substantially concentrically disposed within and in spaced relation to said downstream portion of said second wall member to thereby form an annular exhaust opening therebetween for discharging hot gases generated by said core engine directly to the atmosphere, with said third wall member plane of diametral cross-section being substantially aligned with said second end of said second wall member.

5. The turbofan engine of claim 4 further characterized in that said first and second small angles are within the range of 4°–7° and said third small angle is within the range of 7°–10°.

References Cited

UNITED STATES PATENTS

| 2,416,389 | 2/1947 | Heppner et al. | 60—262 |
| 3,036,431 | 5/1962 | Vdolek | 60—229 |
| 3,161,018 | 12/1964 | Sandre | 60—35.6 |
| 3,238,716 | 3/1966 | Sandre | 60—262 |
| 3,241,313 | 3/1966 | Alderson | 60—230 |
| 3,095,166 | 6/1963 | Brigg | 244—53 |

ROBERT F. STAHL, Primary Examiner

U.S. Cl. X.R.
60—262; 244—54